(12) United States Patent
Kirkpatrick

(10) Patent No.: US 6,744,833 B1
(45) Date of Patent: Jun. 1, 2004

(54) DATA RESYNCHRONIZATION BETWEEN MODULES SHARING A COMMON CLOCK

(75) Inventor: Donald C. Kirkpatrick, Beaverton, OR (US)

(73) Assignee: TUT. Systems, Inc., Pleasanton, CA (US)

( * ) Notice: Subject to any disclaimer, the term of this patent is extended or adjusted under 35 U.S.C. 154(b) by 0 days.

(21) Appl. No.: 09/357,649

(22) Filed: Jul. 20, 1999

(51) Int. Cl.$^7$ .............................. H04L 7/00; G06F 12/16
(52) U.S. Cl. ........................ 375/354; 375/372; 375/354; 711/155
(58) Field of Search ................................. 375/354, 355, 375/356, 371, 372, 319, 320, 357; 711/155; 360/711; 369/194

(56) References Cited

U.S. PATENT DOCUMENTS

| | | | |
|---|---|---|---|
| 3,702,988 A | * 11/1972 | Haney et al. .................. 712/32 |
| 4,596,026 A | * 6/1986 | Cease et al. ................. 375/372 |
| 5,487,092 A | * 1/1996 | Finney et al. ................ 375/354 |
| 6,236,623 B1 | * 5/2001 | Read et al. .................... 368/46 |

\* cited by examiner

*Primary Examiner*—Tesfaldet Bocure
*Assistant Examiner*—Qutub Ghulamali
(74) *Attorney, Agent, or Firm*—Smith-Hill and Bedell

(57) ABSTRACT

An apparatus for resynchronizing data between two modules sharing a common clock where the common clock is delayed at the second module has means for storing multiple copies of the data in the first module in a recirculating manner using a Johnson counter to cycle through storage locations. A multiplexer in the second module has the copies from the first module as inputs and selects in response to a select signal generated from the delayed version of the common clock and an enable signal from the Johnson counter synchronizing each of the copies in turn such that the copy selected has just not been written or is just not about to be written to assure that the data is in a stable state.

9 Claims, 3 Drawing Sheets

DATA RESYNCHRONIZATION BETWEEN MODULES SHARING A COMMON CLOCK

STATEMENT REGARDING FEDERALLY SPONSORED RESEARCH OR DEVELOPMENT

This invention was made with United States Government support under Award 70NANB5H1176 awarded by the United States Department of Commerce, National Institute of Standards and Technology, Advanced Technology Program. The United States Government has certain rights in the invention.

BACKGROUND OF THE INVENTION

The current invention relates to data transfer between modules, and more particularly to a scheme for resynchronizing data between modules sharing a common clock.

The problem presented, as shown in FIG. 1, is that of transferring data across a boundary, such as between two separate modules, where the clock frequency is common on both sides of the boundary but the clock delay across the boundary is unknown. Although first-in/first-out (FIFO) buffers are typically used in smoothing data flow across a boundary where the clock rates on opposite sides of the boundary are different, the current problem may be addressed by inserting a FIFO buffer between the two modules, with the data being clocked into the FIFO buffer by the clock on one side of the boundary and the data being clocked out of the FIFO buffer by the clock on the other side of the boundary. However this adds to the expense of the circuitry by requiring an additional component between the two modules.

What is desired is a scheme for resynchronizing data between modules sharing a common clock without using an external FIFO buffer.

BRIEF SUMMARY OF THE INVENTION

Accordingly the present invention provides a scheme for resynchronizing data between modules sharing a common clock. Successive data records from a first module are stored in successive registers that are enabled in a recirculating manner by the common clock. A multiplexer in a second module selects the outputs from the successive registers in a recirculating manner in response to a delayed version of the common clock in such a manner that the register selected is one not just written into or just about to be written into to assure that the data in the selected register is not in a metastable state. In this manner the data is resynchronized in the second module no matter what the time delay is for the common clock.

The objects, advantages and other novel features of the present invention are apparent from the following detailed description when read in conjunction with the appended claims and attached drawing.

DETAILED DESCRIPTION OF THE INVENTION

Figure 1:
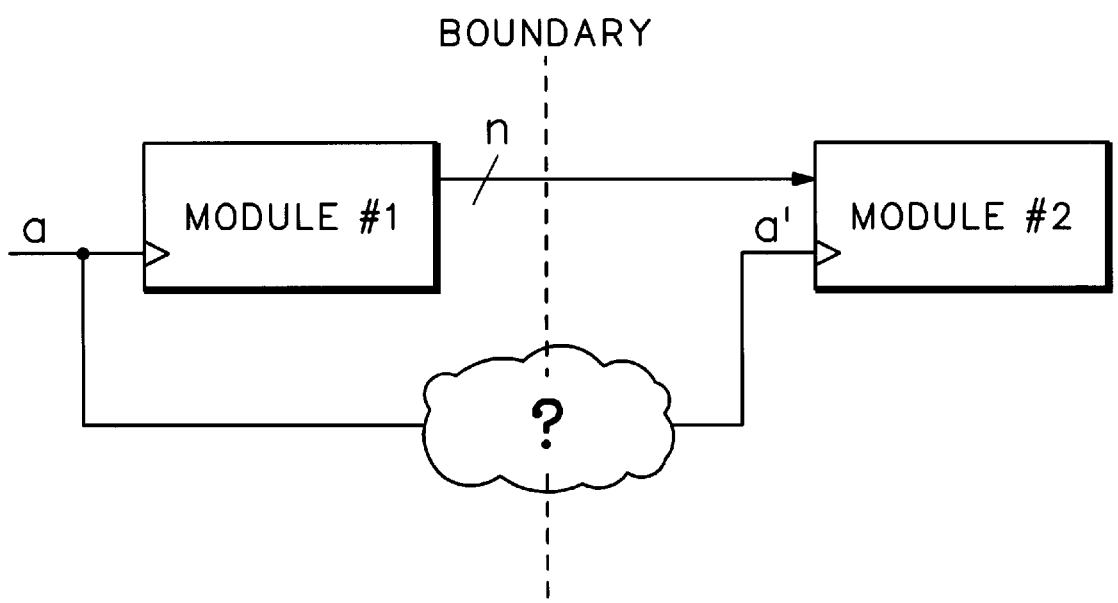
FIG. 1 is a block diagram view representing the problem solved by the present invention.
Figure 2:
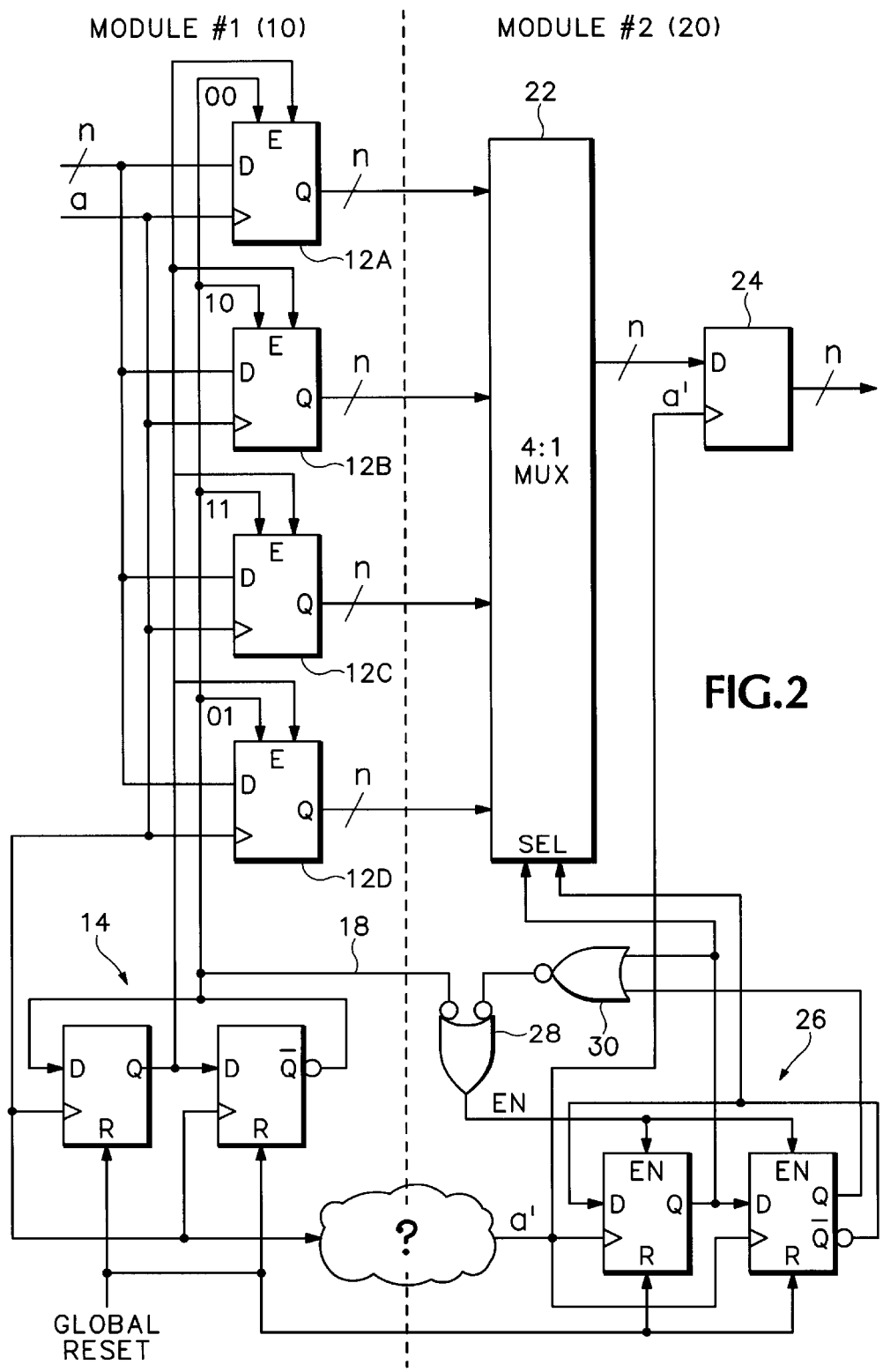
FIG. 2 is a schematic diagram view of the data resynchronizing scheme according to the present invention.

Referring now to FIG. 2 the data to be transferred across the boundary between two modules 10, 20 is input to a plurality of registers 12 in the first module, such as the four registers shown, which are clocked by a clock a. The outputs from the registers 12 are input to a multiplexer or switch 22 in the second module 20 that selects the output from one of the registers of the first module 10 for storage in an output register 24 in the second module clocked by a delayed clock a', which is the clock a from the first module delayed by an unknown amount. The registers 12 in the first module 10 are enabled in a rotating sequence by an enable signal generated by a Johnson counter 14 that is clocked by the clock a. A comparable Johnson counter 26 is in the second module 20 clocked by the delayed clock a'. The Johnson counter 26 in the second module 20 generates a select signal for the multiplexer 22 to transfer the data from the selected register 12 of the first module 10 to the output register 24 in the second module. A single line 18 from the first Johnson counter 14 is coupled to the enables of the second Johnson counter 26 via an enable OR circuit 28 having negative inputs to start the counter a specified number of clock cycles after the first Johnson counter is reset. The other input to the enable OR circuit 28 is gate signal via a NOR circuit 30 having as inputs the outputs from the two positive (Q) outputs of the Johnson counter 26.

Figure 3:
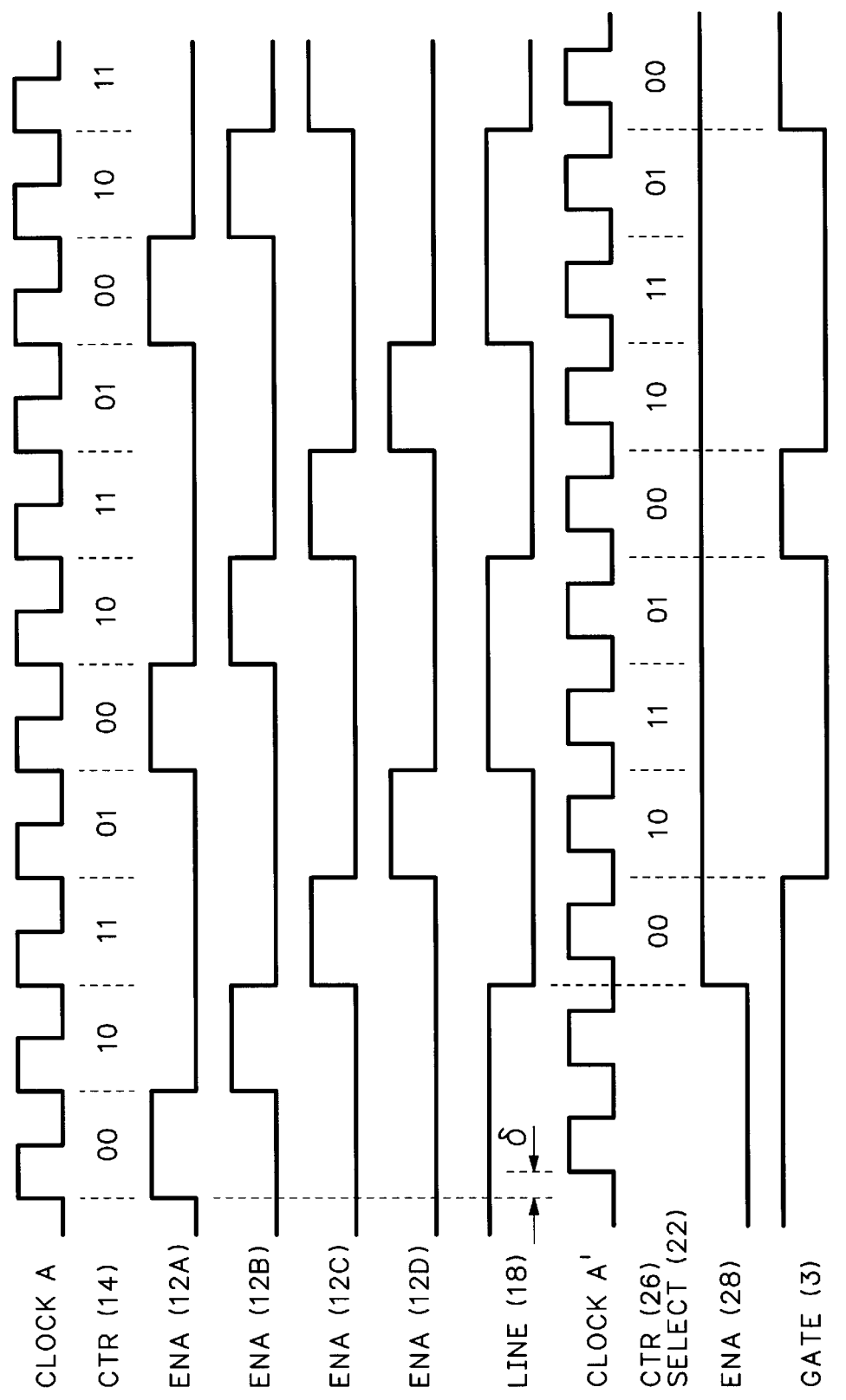
FIG. 3 is a timing diagram view of the data resynchronizing scheme according to the present invention.

The objective of the present invention is to select for transfer to the second module 20 that data from one of the two registers 12 that has not just been written into or is just not about to be written into, i.e., transfer data from those registers that are not possibly in a metastable state. As shown in FIG. 3, when the first Johnson counter 14 is initialized by a global reset signal to a 00 state, the line 18 from the first Johnson counter to the second Johnson counter 26 across the boundary is in a one state. When the first Johnson counter 14 increments to the 10 state, the line 18 to the second Johnson counter 26 is still in the one state. When the first Johnson counter 14 increments to the 11 state, the line 18 to the second Johnson counter 26 changes to a zero state and enables the second Johnson counter to advance from the 00 state. From this point on the counts of the two Johnson counters 14, 26, since they are both clocked by a clock having the same frequency, are offset by a difference of two states, so that the select signal for the multiplexer 22 is always pointing to one of the two registers 12 that has stable data, i.e., is not possibly in a metastable state. The enable OR circuit 28 guarantees the counter 26 continues to advance once it has been enabled. In this way the data is resynchronized between the two modules 10, 20.

As an example, still referring to FIG. 3, at time T=0 a global reset pulse is applied to the Johnson counters 14, 26 which in turn enables the 00 register 12A so that on the next common clock pulse the data is loaded into that register. On the next clock pulse also the 10 register 12B is selected and on the third clock pulse that register the data is loaded into that register. On the third clock pulse also the next 11 register 12C is selected and the second Johnson counter 26 is reset via line 18 so that the output from the 00 register 12A is selected for loading into the output register 24 on the next delayed common clock pulse. On the fourth clock pulse the next 01 register 12D register is selected and the data is loaded into that register on the fifth clock pulse. This process continues, with the data being written into each register 12 in sequence, and being selected for output by the multiplexer 22 in sequence essentially two clock pulses later so the register being accessed is not the most recent one written into or the next register to be written into.

The single control line 18, shown coming from the first module 10 to control the Johnson counter 26 in the second module 20, may be reversed so that the second Johnson counter controls the enabling of the first Johnson counter 14. Also, although FIG. 2 shows a hardware schematic, the modules preferably may be implemented as electonically programmable logic devices (EPLDs) with appropriate software instructions, as is well known in the art.

Thus the present invention resynchronizes data between two modules sharing a common clock by storing the output from the first module in multiple registers in a rotatable manner, and selecting at the second module the data from one of the registers that is in a stable state, also in a rotatable manner.

What is claimed is:

1. An apparatus for resynchronizing data between two modules sharing a common clock comprising:

means for storing a plurality of copies of the data in a first one of the modules in response to the common clock;

a counter having the common clock as an input and providing a clock signal to each location in the storing means in a recirculating manner so that the plurality of copies are stored on a recirculating basis in response to the common clock;

means in a second one of the modules for selecting one of the copies from the storing means; and means for generating a select signal for the selecting means in response to a delayed version of the common clock so that the copy selected from the storing means is assured to be in a stable state, the copies being selected in turn on a recirculating basis;

whereby the data in the second module is resynchronized.

2. The apparatus as recited in claim 1 wherein the storing means comprises a plurality of registers, each being clocked by the common clock and having the data as an input, and each enabled in turn by the controlling means in a recirculating manner to store the data.

3. The apparatus as recited in claim 1 wherein the counter comprises a Johnson counter.

4. The apparatus as recited in claim 1 wherein the selecting means comprises a multiplexer having all of the copies as inputs and having the select signal as an input and providing as an output the selected copy.

5. The apparatus as recited in claim 1 wherein the generating means comprises a second counter having as inputs the delayed version of the common clock and a reset signal from the counter having the common clock as input, the second counter providing as an output the select signal that selects the copies on a recirculating basis so that the copy selected from the storing means is assured to be in a stable state.

6. A method of resynchronizing data between two modules sharing a common clock comprising:

storing a plurality of copies of the data in a first one of the modules in response to the common clock;

counting the common clock and providing a clock signal to each location in the first module in a recirculating manner so that the plurality of copies are stored on a recirculating basis in response to the common clock;

selecting in the second module one of the stored copies; and generating a select signal for the selecting step in response to a delayed version of the common clock so that the selected copy is assured to be in a stable state, the copies being selected in turn on a recirculating basis;

whereby the data in the second module is resynchronized.

7. The method as recited in claim 6 wherein the storing step comprises the step of storing the data in a plurality of registers, each being clocked by the common clock and having the data as an input, and each enabled in turn by the controlling step in a recirculating manner to store the data.

8. The method as recited in claim 6 wherein the selecting step comprises the step of multiplexing the copies as inputs and having the select signal as an input and providing as an output the selected coy.

9. The method as recited in claim 6 wherein the generating step comprises the step of counting the delayed version of the common clock, the step of counting the delayed version of the common clock being reset by a signal from the step of counting the common clock, the step of counting the delayed version of the common clock providing as an output the select signal that selects the copies on a recirculating basis so that the copy selected from the first module is assured to be in a stable state.

* * * * *